United States Patent [19]

Kohno et al.

[11] 3,901,851

[45] Aug. 26, 1975

[54] STRENGTHENED FILMS AND METHOD FOR PRODUCING SAME

[75] Inventors: Mitsuo Kohno, Moriyama; Minoru Nomura, Yokohama; Akio Shibazaki, Tokyo; Takeo Yuasa, Asaka; Yoshihiko Mutoh, Moriyama, all of Japan

[73] Assignee: Asahi Kasei Kogyo Kabushiki Kaisha, Osaka, Japan

[22] Filed: Oct. 4, 1973

[21] Appl. No.: 403,486

[30] Foreign Application Priority Data
Oct. 9, 1972 Japan............... 47-100610

[52] U.S. Cl................ 260/47 C; 428/336; 428/910; 264/289
[51] Int. Cl.²...B29D 7/24; B32B 27/36; C08G 63/02
[58] Field of Search ............ 161/402, 165; 264/288, 264/289, 290 R, 290 J, 210 R; 260/47 C

[56] References Cited
UNITED STATES PATENTS

| | | | |
|---|---|---|---|
| 2,928,132 | 3/1960 | Richards | 264/289 |
| 2,968,065 | 1/1961 | Gronholz | 264/289 |
| 3,432,591 | 3/1969 | Heffelfinger | 264/289 |
| 3,574,046 | 4/1971 | Buteux | 161/402 |
| 3,627,625 | 12/1971 | Jarrett | 161/402 |
| 3,631,899 | 1/1972 | Erickson | 161/402 |
| 3,700,540 | 10/1972 | Buteux | 161/402 |
| 3,816,368 | 6/1974 | Kiichiro | 161/165 |

*Primary Examiner*—George F. Lesmes
*Assistant Examiner*—Ellis P. Robinson
*Attorney, Agent, or Firm*—Armstrong, Nikaido & Wegner

[57] ABSTRACT

A film is provided which is highly suitable for use in magnetic tapes such as for tape recording. The film provides polyethylene-1,2-diphenoxyethane-4,4'-dicarboxylate tape with characteristics heretofore not possible, including an increased longitudinal F–5 value and an improved longitudinal tensile strength. More specifically, in accordance with the invention, there is provided a biaxially stretched film suitable for use as a tape for magnetic recording which is a biaxially stretched film of polyethylene-1,2-diphenoxyethane-4,4'-dicarboxylate having a longitudinal F–5 value of 20 Kg/mm² to 50 Kg/mm², a longitudinal tensile strength of 30 Kg/mm² to 65 Kg/mm², a longitudinal initial modulus of elasticity of 800 Kg/mm² to 1,500 Kg/mm², a transversal tensile strength of 8 Kg/mm² to 20 Kg/mm² and unevenness of thickness of 5% or less, which is produced by first stretching a substantially amorphous polyethylene-1,2-diphenoxyethane-4,4'-dicarboxylate layer whereby there is produced an orientation at least in the direction perpendicular to the extrusion direction and a film density after stretching of not greater than 1.335 in said first stretching, and thereafter subjecting the thus-treaded film to a second stretching step in the extrusion direction at a temperature of 100° to 200°C to yield a total stretching ratio of 5 to 8 times the original length in said second stretching step.

6 Claims, 1 Drawing Figure

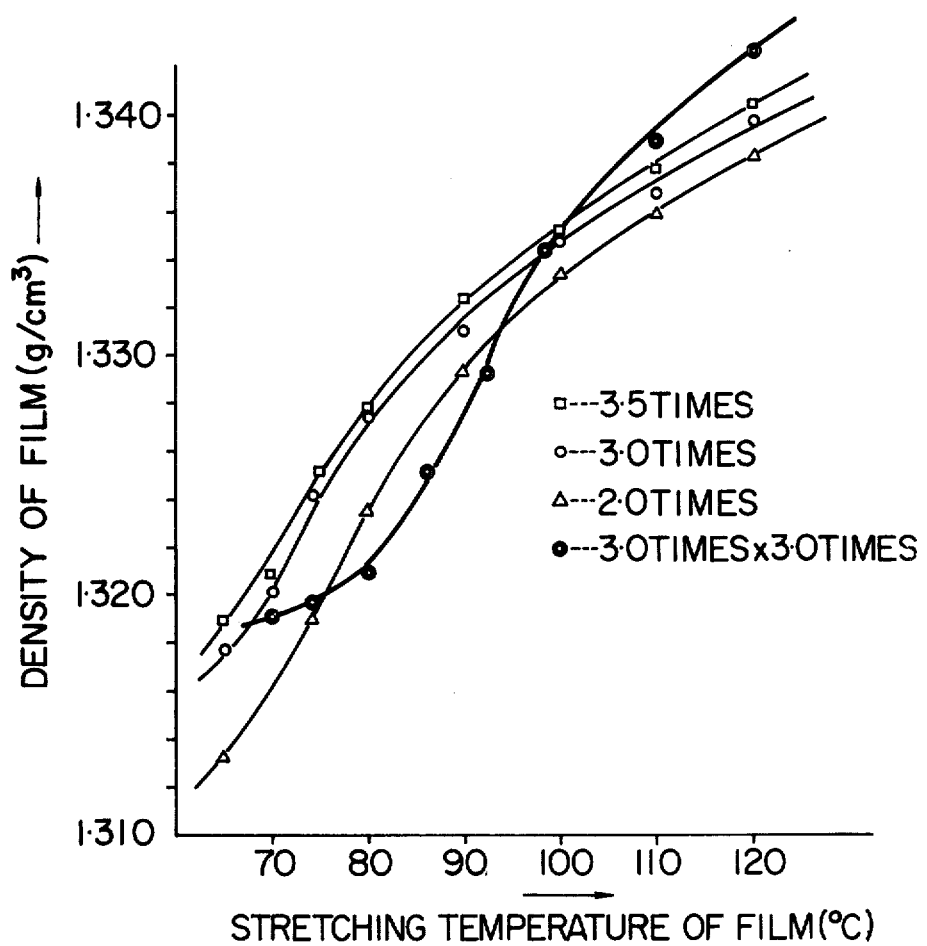

STRENGTHENED FILMS AND METHOD FOR PRODUCING SAME

DESCRIPTION OF THE INVENTION

This invention relates to strengthened films and a method for producing same. More particularly, it relates to biaxially oriented polyethylene-1,2-diphenoxyethane-4,4'-dicarboxylate films having mechanical properties which show great strides of improvement in the extrusion direction (hereinafter referred to as longitudinal direction) and also sufficient strength in the direction perpendicular to the extrusion direction (hereinafter referred to as transversal direction) and a method for producing same.

Heretofore films having an extremely high grade of longitudinal mechanical properties and a sufficient transversal strength have been wanted in various application fields, as a so-called strengthened film. Such films have been prepared mainly from polyethylene terephthalate but recently in the use of those films, it has been earnestly requested to impart to films, higher modulus of elasticity, higher strength and dimensional stability at the time of heating. If these properties are improved, lightness and smallness of packages, and extension of service time for continuous use are realized in the fields of, e.g., magnetic recording tapes, sound recording tapes, type writer ribbons, etc., and commercial values of products will be improved with a great stride. This is the reason of the above-mentioned demand.

Conventionally known strengthened polyethylene terephthalate film having superior properties in one direction had only a longitudinal F-5 value of at the highest, 18 - 20 Kg/mm$^2$. Further, it shows a poor dimensional stability at the time of heating and an initial modulus of elasticity of at the highest, about 750 Kg/mm$^2$. Accordingly, it is not sufficient for the above-mentioned demand.

It is an object of the present invention to provide films having a high modulus of elasticity suitable as base films for magnetic tapes, type writer ribbons, etc.

It is another object of the present invention to provide films having a high grade of dimensional stability and capable of reducing their thickness down to a practical extent.

It is a further object of the present invention to provide a method for producing same.

We have been studying on the films which can overcome the drawbacks of the above-mentioned conventional films and as a result of such study, we have found that a novel highly strengthened film can be prepared from polyethylene-1,2-diphenoxyethane-4,4'-dicarboxylate which is a kind of polyesterether, by the biaxial stretching under specified conditions, and completed the present invention.

According to the present invention, biaxially stretched, longitudinally strengthened polyethylene-1,2-diphenoxyethane-4,4'-dicarboxylate films having a longitudinal modulus of elasticity of 800 Kg/mm$^2$ - 1,500 Kg/mm$^2$, preferably 900 Kg/mm$^2$ - 1,500 Kg/mm$^2$, a longitudinal F-5 value of 20 Kg/mm$^2$ - 50 Kg/mm$^2$, preferably 23 Kg/mm$^2$ - 50 Kg/mm$^2$, more preferably 30 Kg/mm$^2$ - 50 Kg/mm$^2$, a longitudinal tensile strength of 30 Kg/mm$^2$ - 65 Kg/mm$^2$, preferably 35 Kg/mm$^2$ - 65 Kg/mm$^2$, a transversal tensile strength of 8 Kg/mm$^2$ - 20 Kg/mm$^2$, preferably 10 Kg/mm$^2$ - 20 Kg/mm$^2$, a thickness of 1 - 200 $\mu$, an unevenness of thickness of 5% of the original thickness or less and a density of 1.340 - 1.400, can be obtained.

As for biaxially stretched films of polyethylene-1,2-diphenoxyethane-4,4'-dicarboxylate which have been known heretofore, there is disclosed in British Pat. No. 1,171,685 a preparation method for so-called balanced films which are stretched longitudinally and transversally to two or more times the original length so as to give substantially equal tensile strength both in the longitudinal and transversal directions. The method of this patent literature is directed to the production of a film having physical properties equal in the longitudinal and transversal directions as above-mentioned and not other than that. It was, however, impossible according to this method to stretch to 4 times the original length longitudinally and transversally, and resultant films have only a maximum longitudinal yield strength of at the highest 18 Kg/mm$^2$ and a tensile strength to an extent of 25 Kg/mm$^2$.

Further, British Pat. No. 1,136,133, discloses a method for producing uniaxially oriented, longitudinally strengthened films having no tendency transversal fibrillation in which an amorphous film of same polymer is heated and after being crystallized it is longitudinally stretched. According to this method it is true that those having a longitudinal initial modulus of elasticity of more than 1,500 Kg/mm$^2$ can be obtained, but as a matter of fact, the transversal strength of products is extremely low and according to the example illustrated, it is about 3 Kg/mm$^2$ as expressed by yield stress. Moreover, it is common sense for a person skilled in the art that unevenness of thickness in the trasversal direction of product films is large and hence the products cannot be called as high grade strenghtened film at the least and entirely different from the biaxially stretched films of the present invention.

As above mentioned, strengthened films of the polymer of the present invention prepared according to the known process are only those having longitudinal initial modulus of elasticity, longitudinal F-5 value, longitudinal tensile strength, etc., which are hardly different from the values of strengthened films consisting of already known polyethylene terephthalate or those having important defects in unevenness of transversal thickness, mechanical properties, etc.

Whereas we have investigated the characteristic properties of polyethylene-1,2-diphenoxyethane-4,4'-dicarboxylate and earnestly studied the processing conditions of stretching which were most suitable to this polymer, and found that the above-mentioned strengthened films having longitudinal initial modulus of elasticity, longitudinal F-5 value and longitudinal tensile strength which are unexpectably increased and also sufficient transversal tensile strength, are produced by the process hereinafter described. The films of the present invention is also characterized by an extremely small unevenness of thickness in the transversal direction so small as 5% or less. Uniaxially strengthened films have been known in the above-mentioned British Pat. No. 1,136,133, but the films obtained according to the method of this patent has defect in relatively large unevenness of thickness such as 10% or more. Uniaxially strenthened films having a sufficient strength also in the transversal direction and a small unevenness of thickness such as 5% or less have been obtained for the first time according to the method of the present invention.

The films of the present invention are produced by stretching substantially amorphous polyethylene-1,2-diphenoxyethane-4,4'-dicarboxylate film extruded from a die so as to form orientation at least in the direction perpendicular to the extrusion direction and to give a density of the resulting stretched film of 1.335 or less in the first step stretching, and further stretching in the extrusion direction at a temperature of 100° – 200°C to 5 – 8 times the original length in the total stretching ratio in the second step stretching, and if necessary by heat-setting the resultant stretched films at a temperature of 150° – 220°C. The production method of the stregthened film of the present invention includes two stretching steps: In the first step, a film is stretched at least in the transversal direction to give a film having a density of 1.335 or less, and in the second step, the resultant film is stretched at 100° – 200°C in the longitudinal direction to give a total longitudinal stretching ratio of 5 – 8 times the original length. In other words the first step stretching includes a case of transversal stretching alone, and other cases where transversal plus longitudinal stretchings are carried out simultaneously or stepwise in any order, so long as stretching is carried out at least in the transversal direction to give a film having a density of 1.335 or less, and the second step stretching includes a case where longitudinal stretching is carried out one time, and other cases where longitudinal stretching is carried out more than one time, so long as a total longitudinal stretching ratio of 5 – 8 times is obtained. In each of these cases, heat-setting is carried out if it is necessary. In the method of the present invention, unlike conventional films, films which show relatively small heat shrinkage and good dimensional stability can be obtained even when heat-setting is not applied.

The polyethylene-1,2-diphenoxyethane-4,4'-dicarboxylate useful in the present invention can be produced by the condensation of ethylene glycol with 1,2-bis-(p-carboxyphenoxy)ethane or by the ester interchange reaction of preferably ethylene glycol and an ester-formable derivative of 1,2-bis-(p-carboxyphenoxy)ethane such as 1,2-bis-(p-carbomethoxy phenoxy)ethane and the polycondensation of the resultant reaction product.

As for catalysts useful in the ester-interchange reaction at that time, manganese compounds such as conventional manganese acetate, etc., and calcium compounds such as calcium acetate are common.

As for catalysts useful in the polycondensation reaction, antimony compounds such as antimony trioxide, etc., germanium compounds such as germanium dioxide, etc., are common.

In the practice of the present invention, it is possible to use polyethylene-1,2-diphenoxyethane-4,4'-dicarboxylate copolymerized with other component in an amount up to 20 mol % or a mixture of these copolymers.

Copolymerizable monomers include one kind or more of glycol selected from the group consisting of propylene glycol, diethylene glycol, triethylene glycol, tetraethylene glycol, etc., or one kind or more of dicarboxylic acid selected from the group consisting of phthalic acid, bi-benzoic acid, adipic acid, sebacic acid, hexahydroterephthalic acid, naphthalene-2,6-dicarboxylic acid, etc.

The substantially amorphous polyethylene-1,2-diphenoxyethane-4,4'-dicarboxylate useful in the present invention can be obtained by quenching the polymer extruded from a slot die to a temperature of room temperature to 70°C, preferably 60°C or lower. Uniaxial or biaxial stretching of resultant films by way of conventional process brings about great difficulty due to the specific nature of its crystallization behavior. Namely, since the glass transition temperature of polyethylene-1,2-diphenoxyethane-4,4'-dicarboxylate is about 70°C and since the crystallization starting temperature of heated amorphous material is about 75°C, the optimum stretching temperature which has been heretofore considered to be acceptable from common sense is in so extremely narrow range such as 70° – 74°C. There is also a process which, contrary to common sense, is carried out at a further higher temperature, but at such a temperature, crystallization advances by heating and reduces stretching property. For example, in the uniaxial stretching of the above-mentioned British Pat. No. 1,136,133, stretching ratio greater than 5 times was difficult and in the biaxial stretching of British Pat. No. 1,171,685, stretching greater than 4 times in both the directions was difficult. As a result of our study on the process of biaxial stretching, we have found that longitudinal stretching to 5 times or more and as maximum up to 8 times is possible by the process in which substantially amorphous layer is stretched at least in the direction perpendicular to the extrusion direction at a relatively low temperature but at a temperature at which a sufficient orientation occurs, to give an at least uniaxially stretched film under condition of suppressed crystallization as much as possible although birefringence is formed therein, which is further stretched on heating rapidly in the longitudinal direction.

The production process of the films of the present invention will be described in detail.

In order to bring the substantially amorphous polyethylene-1,2-diphenoxyethane-4,4'-dicarboxylate films in the state oriented at least in the direction perpendicular to the extrusion direction, it is uniaxially stretched in the direction perpendicular to the extrusion direction in the first stretching or it is biaxially stretched in the direction of extrusion and the direction perpendicular to the extrusion direction either simultaneously or stepwise. In the uniaxial stretching in the direction perpendicular to the extrusion, as well as in the biaxial stretching, the optimum temperature for stretching, although varied according to stretching ratio, is 100°C or lower, preferably 90°C or lower. However, it is preferable to avoid a temperature lower than 70°C, because the production of uniformly stretched films at a speed suitable to the actual production is difficult. The stretching ratio at this time is 2 – 4 times in the extrusion direction and in the direction perpendicular to the extrusion direction. With the increase of stretching ratio, crystallization due to orientation is promoted and when stretching ratio is increased, it is preferable to carry out stretching at a lower temperature.

It is a generally accepted manner to express the extent of crystallization by way of density. The density of perfectly amorphous polyethylene-1,2-diphenoxyethane-4,4'-dicarboxylate is 1.303 and that of perfectly crystalline material is 1.450. The films which are oriented at least in the direction perpendicular to the extrusion direction in the first step stretching (important requirement for producing the films of the present invention) should have a density in the range of 1.335 to 1.315 and most preferable density is in the range of 1.330 – 1.320.

The above-mentioned relationship can be described referring to attached drawing wherein the relationship between stretching temperature and stretching ratio and density of film is shown as a graph, and a symbol ☐ — ☐ shows a uniaxial stretching with 3.5 times of stretching ratio, O — O shows a uniaxial stretching with 3.0 times of stretching ratio, △ — △ shows a uniaxial stretching with 2.0 times of stretching ratio and ◎ — ◎ shows a biaxial stretching with stretching ratios of 3.0 times × 3.0 times. Thus the FIGURE shows the relation of the change of the density of these films relative to stretching temperature and stretching ratio at the time when substantially amorphous films having a density of 1.306 are uniaxially stretched at a fixed width by means of a biaxial stretching apparatus (manufactured by Iwamoto Seisakusho) and also at the time when they are biaxially stretched in the same apparatus.

As evident from this FIGURE, stretching temperatures in the optimum range corresponding to a density of 1.330 are 86°C for uniaxial stretching with 3 times of stretching ratio, 92°C for uniaxial stretching with 2 times of stretching ratio and 92°C for biaxial stretching with 3 times × 3 times of stretching ratios.

With regard to the stretching in the extrusion direction, i.e., the second step stretching, stretching is carried out to 5 times – 8 times preferably 6 – 8 times the original length in total in the extrusion direction at a high temperature of 100°C – 200°C. It is a fact which cannot be anticipated from the conventional art that only the films which have been maintained at a specified density under the above-mentioned conditions and oriented at least in the direction perpendicular to the extrusion direction can be stretched with such a high stretching ratio as high as 5 times or more in total in the extrusion direction in the second step stretching of extrusion direction.

The stretching temperature in the second step stretching should be a temperature of 100°C or higher, preferably in the range of 120°C – 180°C. If it excels 200°C, molecular flow of polymer occurs to make stretching effectiveness poor, and hence the excelling temperatures are not preferable. The higher the stretching temperature is, the more the crystallization degree is increased, and the less the heat shrinkage after stretching is. If a suitable stretching temperature is selected, there is an advantage that heat-setting can be omitted after stretching or even heat-setting carried out under extremely gentle condition serves the purpose. Particularly, if the second step stretching is carried out in two or more stages at a higher temperature in the above-mentioned range, the above-mentioned effect can be attained much more easily.

The second step stretching can be carried out by a customary procedure which relies on the pass between a slow roll set and a fast roll set. It is preferable to make the stretching region of film as narrow as possible. If the diameters of rolls are narrowed, and the free path line between two roll sets is narrowed very much, the above-mentioned requirement is satisfied, but there is a limitation for the above-mentioned problem from the strength of apparatus and other restrictive conditions. There is another method, as alternative, wherein, in place of the method of heating slow and fast rolls and thereby maintaining the stretching temperature, an extremely narrow width range of film, e.g., 50 mm or less in the direction of length is heated by the irradiation of infrared ray or the like and the stretching point is fixed almost in that range. This is one of the most advantageous method which enables to perform stabilized and uniform stretching in the point that adhesion and sticking of film onto rolls at high temperatures do not occur. Since an accurate control is necessary for stretching temperature, a controlling method carried out by way of the control of the capacity of infrared heater while measuring the actual temperature of the film at the stretching point irradiated by the infrared heater, by means of infrared thermometer on sale or the like, is employed.

Since the films thus obtained show small heat shrinkage, they can be used, as they are, but if desired, there will be no harm in heat-setting at a temperature of 150°C or higher, preferably in the range of 180° – 220°C. By the heat-setting, films having extremely low shrinkability can be obtained. For example, films superior in dimensional stability which show shrinkage of 1 – 4%, preferably 1 – 3%, after the heat treatment at 150°C for 2 hours can be obtained.

The polymers useful in the films of the present invention are polyethylene-1,2-diphenoxyethane-4,4'-dicarboxylate and its copolymer. It is preferable that the molecular weight of the polymer corresponding to an intrinsic viscosity $[\eta]$ as measured in 1% solution in o-chlorophenol at 35°C is 0.5 or more. Too high a molecular weight is not preferable because of expensive polymer cost. Too low a molecular weight causes trouble in film-forming property.

So long as the property of film is not injured, admixing of various kinds of additives to the polymers of the present invention can be carried out arbitrarily. For example, slip-improving agent (lubricant) such as kaoline, $SiO_2$, $TiO_2$, etc., pigments antistatic agents, crystallization-nucleating agents, light stabilizers, etc. can be added without producing any harmful effect.

Another characteristic feature of the films of the present invention is easiness for forming thin foil when compared with films consisting of known polyesters such as polyethylene terephthalate or the like. Even under conditions for sufficiently elevating strength, thin foil can be formed with good productivity. As described in the beginning of the specification, thin foil forming due to strenghthening can bring about preferable effect upon the attempt to turn commercial products such as magnetic tapes, etc., to lighter weight products and longer products.

In order to describe the nature of the present invention more fully, following examples are offered relating to the process for producing the films of the present invention but it should not be construed to be limitative to the present invention.

Tensile strength, F–5 value, elongation at break, initial modulus of elasticity were measured according to JIS–C–2318–1966.

EXAMPLE 1

Polyethylene-1,2-diphenoxyethane-4,4'-carboxylate having an intrinsic viscosity of 0.68 as measured in o-chlorophenol (as 1% solution) at 35°C, was extruded from T-die at 280°C onto a casting roll cooled to 60°C to give a substantially amorphous film having a thickness of 200 μ and a density of 1.308. The film thus obtained was at first stretched to 3 times the original width with a given width in the perpendicular direction to the extruding direction by means of an experimental apparatus manufactured by Iwamoto Seisakusho, Japan (in the first step stretching). The density of the resulting film is shown in Table 1. The film was then stretched by means of heating rolls in the perpendicular direction to the foregoing stretching direction with a free width (second step stretching). The maximum stretching ratios at break at a heating roll temperature of 140°C are also shown in Table 1.

As seen from the Table, when the density exceeds 1.335, stretching to 5 times or more becomes impossible.

Table 1

| First step stretching | | | Second step stretching | |
|---|---|---|---|---|
| Ratio | Temperature | Density | Temperature | Maximum stretching ratio |
| 3 | 74°C | 1.324 | 140°C | 7.1 |
| 3 | 80 | 1.327 | 140 | 7.8 |
| 3 | 86 | 1.327 | 140 | 7.3 |
| 3 | 92 | 1.331 | 140 | 6.4 |
| 3 | 98 | 1.333 | 140 | 5.2 |
| 3 | 110 | 1.337 | 140 | 3.8 |

EXAMPLE 2

Dried chips of polyethylene-1,2-diphenoxyethane-4,4'-dicarboxylate were extruded from a T-die at 280°C onto a casting roll cooled to 60°C to give a substantially amorphous film having a thickness of 100 μ, a density of 1.304 and an intrinsic viscosity of 0.64 as measured in o-chlorophenol (as 1% solution) at 35°C. The resulting film was continuously led to a tenter apparatus (laterally stretching machine), where it was stretched to various stretching ratios in the direction perpendicular to the extruding direction at various preheating stretching temperatures shown in Table 2 (first step stretching). Next, the clip-holded parts at both the edges, of the resulting film were trimmed and thereafter led to a stretching machine arranged in the extruding direction, provided with an infrared heater between a slower set and a faster set of rolls, where the film was stretched at various temperatures and with various ratios shown in Table 2 (second step stretching). Each resulting film was heat-set at 210°C if necessary. The physical properties of the films obtained under these conditions are also shown in Table 2.

Table 2

| | TD stretching conditions | | | MD stretching conditions | | | Physical properties of biaxially stretched film (Values in parentheses are those after heat set) | | | | | | | | | |
|---|---|---|---|---|---|---|---|---|---|---|---|---|---|---|---|---|---|
| No. | Temperature (°C) | Ratio | Density of uniaxially stretched film | Temperature (°C) | Ratio | Thickness (μ) | Unevenness of thickness (%)* | Density (g/cm³) | Initial modulus of elasticity (Kg/mm²) | F-5 value (Kg/mm²) | | Tensile strength (Kg/mm²) | | Elongation at break (%) | | Heat shrinkage (%) | |
| | | | | | | | | | | MD | TD | MD | TD | MD | TD | MD | TD |
| 1 | 70 | 3.0 | 1.320 | 150 | 7.3 | 4.3 | 2.8 | 1.347 | 1080 | 39 | 7.8 | 40 | 11 | 11 | 80 | 7.7 | 6.8 |
| 2 | 80 | 3.0 | 1.327 | 150 | 7.5 | 4.2 | 2.8 | 1.348 (1.353) | 1100 (1080) | 44 (41) | 8.2 (9.0) | 52 (48) | 12 (14) | 10 (11) | 77 (82) | 7.4 (1.5) | 6.8 (1.2) |
| 3 | 105 | 3.0 | 1.336 | 150 | 4.2 | 7.7 | 8.2 | 1.346 | 780 | 17 | 8.1 | 24 | 11 | 9 | 42 | 8.2 | 7.8 |
| 4 | 80 | 2.0 | 1.323 | 150 | 6.0 | 8.1 | 3.0 | 1.345 | 1040 | 32 | 7.4 | 41 | 10 | 10 | 88 | 8.8 | 8.0 |
| 5 | 80 | 2.5 | 1.325 | 150 | 8.2 | 4.8 | 2.9 | 1.347 (1.354) | 1120 (1080) | 42 (38) | 7.5 (8.3) | 55 (48) | 10 (11) | 9 (12) | 75 (82) | 8.6 (1.2) | 7.4 (0.9) |
| 6 | 80 | 3.5 | 1.331 | 150 | 5.8 | 4.9 | 1.8 | 1.349 | 1010 | 31 | 8.5 | 42 | 13 | 12 | 77 | 6.5 | 4.2 |
| 7 | 80 | 4.0 | 1.337 | 150 | 3.8 | 6.4 | 2.2 | 1.348 | 520 | 13 | 14 | 22 | 24 | 32 | 44 | 7.2 | 6.8 |
| 8 | 80 | 3.0 | 1.327 | 95 | 4.3 | 7.7 | 9.2 | 1.342 | 750 | 16 | 11 | 28 | 18 | 23 | 58 | 1.8 | 9.4 |
| 9 | 80 | 3.0 | 1.327 | 120 | 5.5 | 6.0 | 2.6 | 1.345 | 1000 | 30 | 8.2 | 41 | 11 | 9 | 68 | 9.4 | 8.2 |
| 10 | 80 | 3.0 | 1.327 | 140 | 7.3 | 4.3 | 2.5 | 1.347 (1.354) | 1050 (1030) | 32 (30) | 7.9 (8.4) | 45 (43) | 11 (13) | 8 (9) | 60 (64) | 8.7 (0.9) | 7.3 (0.7) |
| 11 | 80 | 3.0 | 1.327 | 160 | 7.8 | 4.1 | 2.0 | 1.350 (1.354) | 1150 (1130) | 46 (43) | 7.7 (8.8) | 60 (58) | 11 (12) | 8 (9) | 58 (60) | 5.2 (0.9) | 4.6 (0.8) |
| 12 | 80 | 3.0 | 1.327 | 180 | 5.5 | 6.0 | 2.1 | 1.353 | 1000 | 29 | 8.2 | 38 | 11 | 11 | 70 | 3.8 | 3.5 |
| 13 | 80 | 3.0 | 1.327 | 190 | 6.3 | 5.2 | 2.7 | 1.350 | 1060 | 33 | 7.9 | 42 | 12 | 9 | 70 | 5.0 | 3.8 |
| 14 | 80 | 3.0 | 1.327 | 210 | 5.2 | 6.3 | 6.7 | 1.348 | 970 | 18 | 7.6 | 24 | 11 | 15 | 88 | 7.8 | 6.5 |
| 15 | 60 | 3.0 | 1.314 | 150 | 5.5 | 4.2 2.5 | 80 | unmeasurable due to large unevenness of thickness | | | | | | | | | |
| 16 | 65 | 2.0 | 1.313 | 150 | 6.0 | 4.0 0.5 | 110 | unmeasurable due to large unevenness of thickness | | | | | | | | | |
| 17 | 90 | 3.8 | 1.337 | 150 | 3.9 | 6.5 | 6.4 | 1.349 | 550 | 13 | 13 | 22 | 23 | 35 | 40 | 7.5 | 7.2 |
| 18 | 100 | 3.6 | 1.338 | 150 | 4.0 | 7.1 | 7.5 | 1.349 | 610 | 14 | 12 | 25 | 21 | 11 | 40 | 7.5 | 7.4 |

*Unevenness of thickness was measured by means of a dial gauge and is expressed by the following formula:

$$\frac{\text{Maximum thickness} - \text{Minimum thickness}}{\text{Average thickness}} \times 100 \, (\%)$$

Notes:

1. The stretching ratio in the extruding direction shows the maximum stabilized stretching ratio under the conditions described in the above Table.

2. The heat shrinkage shows the percentage variation of the dimension of the film after heated in the air at 150°C, for 2 hours.

3. MD and TD in the Table show the longitudinal direction (machine direction) and transversal direction, respectively.

As seen from the Table 2, those films which do not satisfy the conditions of the present invention are not furnished with the excellent properties of the present invention.

EXAMPLE 3

A substantially amorphous film obtained in Example 1, was at the same time biaxially stretched to 2 times × 2 times at 80°C by means of the same apparatus as in Example 1 to produce a film having a density of 1.321 first step stretching). The resulting film was further uniaxially stretched to 2.5 times at stretching temperatures shown in Table 3 (second step stretching).

The physical properties of the films in the second stretching direction are shown in Table 3.

Table 3

| Stretching temperature (°C) | 130 | 160 | 190 |
|---|---|---|---|
| F-5 value (Kg/mm²) | 25 | 27 | 26 |
| Tensile strength (Kg/mm²) | 33.5 | 36.6 | 35.2 |
| Elongation at break (%) | 18 (12) | 12 (12) | 10 (13) |
| Initial modulus of elasticity (Kg/mm²) | 800 | 920 | 900 |
| Heat shrinkage by heat-treatment at 150°C, (%) for 2 hours | 7.5 | 6.0 | 3.9 |

Note: Values in the parentheses are those in the TD direction.

EXAMPLE 4

A substantially amorphous film obtained in Example 1 was at first stretched to 2 times in the perpendicular direction to the extruding direction at 85°C and then stretched at 85°C in ratios shown in Table 4 in the extruding direction, by means of the same apparatus as in Example 1 (first step stretching). Further, each resulting film was stretched to 5.5 times in total in the extruding direction at 140°C (second step stretching), then subjected to crystallization at 200°C, for 1 minute, under tension, and heat-set.

The physical properties of the resulting films are shown in Table 4.

Table 4

| Second step stretching ratio | | 2 | 2.5 | 3 | 3.5 |
|---|---|---|---|---|---|
| F-5 value | in the stretching direction at 5.5 times | 27 | 28 | 27.5 | 25.5 |
| Tensile strength (Kg/mm²) | " | 35 | 38 | 37 | 33 |
| Elongation at break (%) | " | 19 | 15 | 9 | 10 |
| Initial modulus of elasticity (Kg/mm²) | " | 900 | 960 | 930 | 830 |
| Heat shrinkage by heat treatment at 150°C, for 2 hrs. (%) | " | 2.0 | 1.8 | 1.8 | 1.8 |
| Tensile strength (Kg/mm²) | in the stretching direction at 2 times | 10.0 | 11.2 | 11.8 | 11.5 |
| Density after 1st step stretching | | 1.323 | 1.324 | 1.325 | 1.327 |

EXAMPLE 5

A substantially amorphous film obtained in Example 1 was at first stretched in the transversal direction in the first step stretching, and then stretched in the longitudinal direction in two divided steps in the second step stretching under the conditions shown in Table 5. Then each resulting film was heat-set at 210°C. The physical properties of the films thus obtained are shown in Table 5.

Table 5

| First step stretching | | | Second step stretching | | | | | Physical properties of film | | | | | |
|---|---|---|---|---|---|---|---|---|---|---|---|---|---|
| | | | 1st step | | 2nd step | | | | | | | | |
| Temperature | Ratio | Film density (g/cm³) (1) | Temperature | Ratio | Temperature | Ratio | Total ratio | Thickness (μ) X (2) | Initial modulus of elasticity in MD direction (kg/mm²) | F-5 value in MD direction (kg/mm²) | Tensile strength in MD direction (kg/mm²) | Heat shrinkage in MD direction (%) (3) | Tensile strength in TD direction (kg/mm²) |
| 80°C | 2.4 | 1.325 | 130°C | 3.9 | 150°C | 1.7 | 6.63 | 9.5 | 1150 | 42 | 60 | 2.0 | 9 |
| 82 | 2.7 | 1.327 | 130 | 4.3 | 150 | 1.5 | 6.45 | 8.7 | 1100 | 37 | 53 | 1.8 | 10 |
| 80 | 3.0 | 1.328 | 130 | 4.7 | 150 | 1.4 | 6.58 | 7.5 | 1065 | 36 | 48 | 1.7 | 10 |
| 78 | 3.3 | 1.327 | 130 | 5.0 | 150 | 1.2 | 6.0 | 7.6 | 990 | 28 | 39 | 1.5 | 11 |

Table 5—Continued

| First step stretching | | | Second step stretching | | | | | | Physical properties of film | | | | |
|---|---|---|---|---|---|---|---|---|---|---|---|---|---|
| | | | 1st step | | 2nd step | | | | | | | | |
| Temperature | Ratio | Film density (g/cm³) | Temperature | Ratio | Temperature | Ratio | Total ratio | Thickness (μ) X | Initial modulus of elasticity in MD direction (kg/mm²) | F-5 value in MD direction (kg/mm²) | Tensile strength in MD direction (kg/mm²) | Heat shrinkage in MD direction (%) | Tensile strength in TD direction (kg/mm²) |
| | | (1) | | | | | | (2) | | | | (3) | |
| 78 | 3.6 | 1.328 | 130 | 5.3 | 150 | 1.2 | 6.36 | 6.6 | 980 | 28 | 37 | 1.8 | 11 |
| 80 | 3.0 | 1.328 | 130 | 5.0 | 150 | 1.2 | 6.0 | 7.6 | 1000 | 32 | 43 | 3.6 | 12 |

Notes:
(1) After stretching
(2) Average thickness
(3) Percentage variation of dimension of film at 150°C × 2 hrs.

EXAMPLE 6

Copolymer A-40 having 10 mol % of terephthalic acid copolymerized (having an intrinisc viscosity of 0.650 as measured in the same measuring manner) was extruded at 280°C from T die onto a casting roll cooled to 60°C to obtain a substantially amorphous film having a thickness of 100 μ and a density of 1.301, which was successively led to a tenter apparatus and stretched there at 80°C to 3.2 times the original width in the transversal direction. The density of film at this time was 1.326. Next, the resulting film was stretched at 160°C to 5.8 times the length after the first step stretching in the longitudinal direction by means of the longitudinally stretching apparatus of Example 2, and then heat-treated at 210°C. The physical properties of the resulting film were as follows:

| | |
|---|---|
| Thickness: | 5.4 μ |
| Unevenness of thickness in TD: | 2.0% |
| Density: | 1.351 |
| Initial modulus of elasticity: | 940 Kg/mm² |
| F-5 (MD): | 27 Kg/mm² |
| F-5 (TD) | 8.5 Kg/mm² |
| Tensile strength (MD): | 36 Kg/mm² |
| Tensile strength (TD): | 13 Kg/mm² |
| Elongation at break (MD): | 14% |
| Elongation at break (TD): | 70% |
| Heat shrinkage (MD): | 4.0% |
| Heat shrinkage (TD): | 2.8% |

Comparative Experiment 1

A substantially amorphous film obtained in Example 1 (200 μ thick) was biaxially stretched at the same time longitudinally and laterally to 3.75 times at 95°C by means of a biaxially stretching machine, and then heat-set at 210°C. The physical properties of the resulting film were as follows:

| | |
|---|---|
| Thickness: | 14 μ |
| Density: | 1.353 (g/cm³) |
| F-5 value: | 14.6 (Kg/mm²) |
| Yield strength: | 18.5 (Kg/mm²) |
| Tensile strength: | 24.5 (Kg/mm²) |
| Initial modulus of elasticity: | 560 (Kg/mm²) |
| Elongation at break: | 40 (%) |
| Heat shrinkage at 150°C for 2 hours: | 2.0 (%) |

Comparative Experiment 2

Substantially amorphous film (having a thickness of 100 μ and an unevenness of thickness of 4%) obtained in Example 2 was heat-treated at 180°C for 30 seconds on a heated roll and then roll-stretched at 150°C to 4.7 times the original length in the longitudinal direction. The physical properties of the resulting film were as follows:

| | |
|---|---|
| Thickness: | 21 μ |
| Unevenness of thickness (TD): | 14.3% |
| Density: | 1.352 |
| F-5 value (MD): | 24.8 Kg/mm² |
| F-5 value (TD): | 3.2 Kg/mm² |
| Tensile strength (MD): | 35 Kg/mm² |
| Tensile strength (TD): | 6.6 Kg/mm² |
| Initial modulus of elasticity (MD): | 1400 Kg/mm² |
| Elongation at break (MD): | 8 % |
| Elongation at break (TD): | 10 % |
| Heat shrinkage (MD): (120°C, 2 hrs.) | 0.5 % |
| (120°C, 2 hrs.) (TD): | 0.3 % |

As evident from the above Examples, the films of the present invention, as the result of improvement of known processes as well as establishment of conditions suitable to the polymers of the present invention, have remarkably improved mechanical properties as compared with conventional films strengthened in the longitudinal direction (i.e., in the lengthy direction).

Namely, the films of the present invention are biaxially oriented films of high grade having such strengths that the initial modulus of elasticity is in the range of 800 to 1,500 Kg/cm²; the F-5 value is in the range of 20 to 50 Kg/mm², (preferably 23 Kg/mm² or higher); and the tensile strength is in the range of 30 to 65 Kg/mm²; while the tensile strength in the lateral direction (i.e., in the width direction) is in the range of 8 to 20 Kg/mm². Further the films of the present invention have also a great advantage in that they are superior in the dimensional stability at the time of heating. Furthermore, they have also such an important feature of superior formability of thin foil that, as shown in the above Examples, films having a thickness of 4 – 6 μ and having the above-mentioned physical properties can be prepared in stabilized manner. In view of the above-mentioned features, the films of the present invention are useful for magnetic recording tape, sound-recording tape, video tape, typewriter ribbon, measuring tape, adhesive tape, film for gold or silver threads, film for stamping foil, etc.

For magnetic tapes, it is in general considered to be better in quality that the tapes have a greater strength in the longitudinal direction, a certain extent of strength in the transversal direction, a smaller unevenness of thickness and a smaller heat shrinkability. The films of the present invention satisfy all of the above-mentioned conditions and hence are most suitable for magnetic tapes.

What is claimed is:

1. A biaxially stretched film suitable for use as a tape for magnetic recording which is a biaxially stretched polyethylene-1,2-diphenoxyethane-4,4'-dicarboxylate homopolymer film having a longitudinal F-5 value of 20 Kg/mm$^2$ to 50 Kg/mm$^2$, a longitudinal tensile strength of 30 Kg/mm$^2$ to 65 Kg/mm$^2$, a longitudinal initial modulus of elasticity of 800 Kg/mm$^2$ to 1500 Kg/mm$^2$, a transversal tensile strength of 8 Kg/mm$^2$ to 20 Kg/mm$^2$ and an unevenness of thickness of 5% or less, which is produced by first stretching at a temperature in the range of 70°–100°C a substantially amorphous polyethylene-1,2-diphenoxyethane-4,4'-dicarboxylate layer whereby there is produced an orientation at least in the direction perpendicular to the extrusion direction and a film density after stretching in the range of 1.315 to 1.335 in said first stretching, and thereafter subjecting the thus-treated film to a second stretching step in the extrusion direction at a temperature of 100°C to 100°C to yield a total stretching ratio of 5 to 8 times the original length in said second stretching step.

2. Biaxially stretched films according to claim 1 wherein said longitudinal F-5 value is 23 Kg/mm$^2$ to 50 Kg/mm$^2$, said longitudinal tensile strength is 33 Kg/mm$^2$ to 65 Kg/mm$^2$, said longitudinal initial modulus of elasticity is 900 Kg/mm$^2$ to 1500 Kg/mm$^2$ and said transversal tensile strength is 10 Kg/mm$^2$ to 20 Kg/mm$^2$.

3. Biaxially stretched films according to claim 2 wherein said longitudinal F-5 value is 30 Kg/mm$^2$ to 50 Kg/mm$^2$.

4. Biaxially stretched films according to claim 1 wherein the thickness of film is in the range of 4 $\mu$ to 6 $\mu$.

5. Biaxially stretched films according to claim 1 wherein heat-shrinkage of the films after the processing at 150°C for 2 hours is in the range of 1 to 4%.

6. A method for producing strengthened polyethylene-1,2-diphenoxyethane-4,4'-dicarboxylate films which comprises stretching at a temperature in the range of 70°–100°C a substantially amorphous polyethylene-1,2-diphenoxyethane-4,4'-dicarboxylate layer to give an orientation at least in the direction perpendicular to the extrusion direction a stretching ratio in the range of 2–4 times the original width and a film density after stretching of 1.335 or less in the first step stretching, and then stretching in the extrusion direction at a temperature of 100°C to 200°C to give a total stretching ratio of 5 – 8 times the original length in the second step stretching.

* * * * *